UNITED STATES PATENT OFFICE.

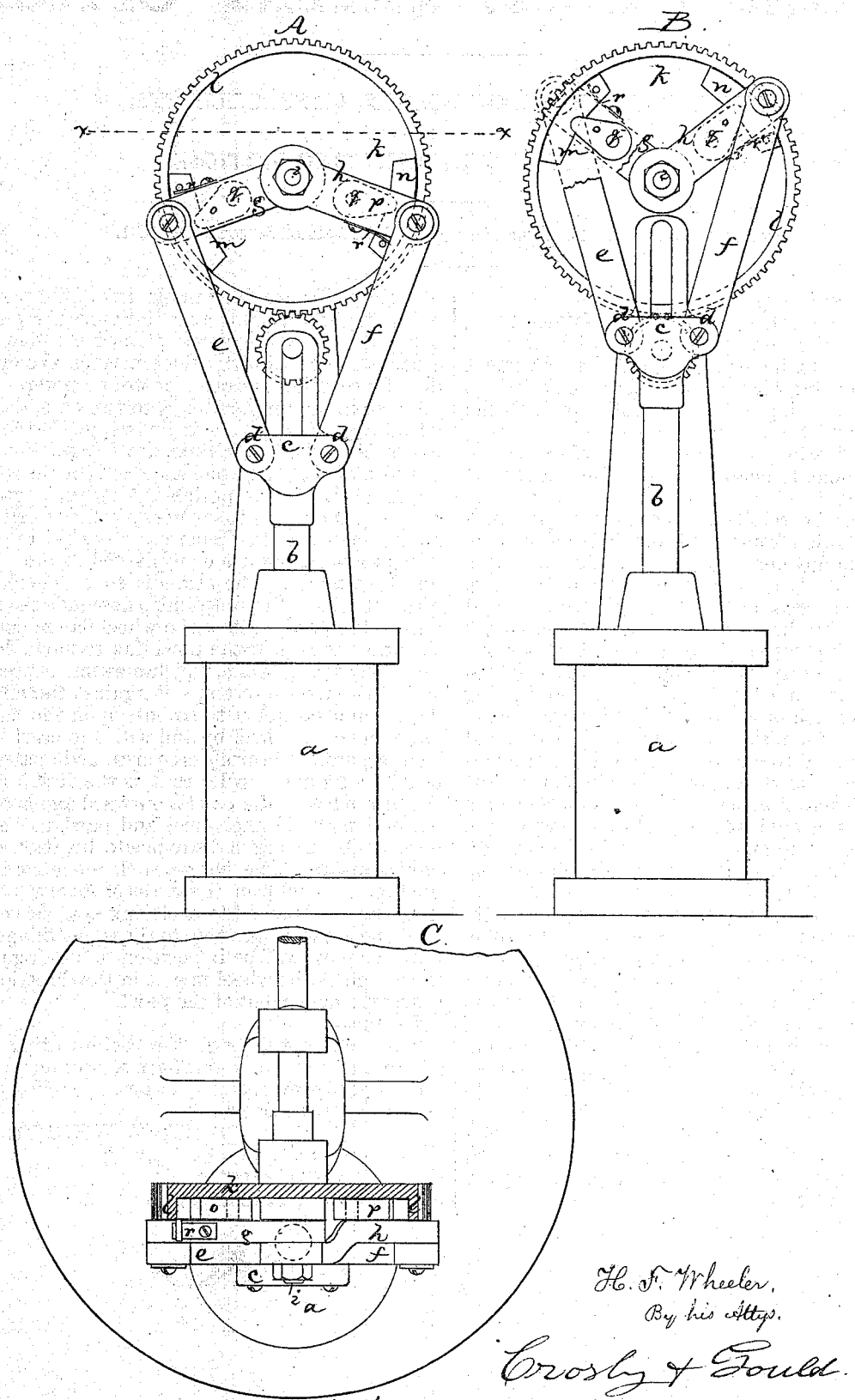

HENRY F. WHEELER, OF BOSTON, MASSACHUSETTS.

IMPROVEMENT IN TRANSMITTING MOTION.

Specification forming part of Letters Patent No. 119,437, dated September 26, 1871.

*To all whom it may concern:*

Be it known that I, HENRY F. WHEELER, of Boston, in the county of Suffolk and State of Massachusetts, have invented an Improvement in Transmitting Motion; and I do hereby declare that the following, taken in connection with the drawing which accompanies and forms part of this specification, is a description of my invention sufficient to enable those skilled in the art to practice it.

My invention relates to a method of imparting a rotating motion from a reciprocating motion without the employment of a crank, the invention being particularly adapted to hydraulic motors in which a reciprocating piston is operated by a head of water. My invention consists in combining, with a reciprocating piston actuated by the water-head, a rotary wheel connected with the piston by a link-and-pawl mechanism, there being two links, each of which is jointed at one end to the head of the piston-rod, while at the other end each is jointed to one of two other links or lever-arms pivoted to the shaft of the wheel, said last links each actuating a friction-pawl; one of which pawls presses against the wheel-flange when the piston moves up and turns the wheel in one direction, while the other pawl binds against the flange and rotates the wheel in the same direction when the piston moves down, and this without regard to the length or speed of the stroke. It is in this construction that the invention consists, or in the combination, with the reciprocating piston, of the opposite links jointed to the pawl-links or levers, the friction-pawl of one of which acts on the flange of the wheel to be driven, at the descent of the piston, and turns said wheel, while the friction-pawl of the opposite lever acts on the wheel and turns it (in the same direction) at the rise of the piston, thus effecting a continuous rotary motion without crank or dead-center.

The drawing represents a machine embodying the improvement.

A shows the machine in elevation, the piston-rod being down. B is a similar view, the piston being up. C is a sectional plan on the line *x x*. *a* denotes the cylinder, which may be the cylinder of a common hydraulic motor or meter. *b* is the piston, having a head, *c*, to two ears, *d d*, of which are jointed the two links *e f*. To the upper ends of these two links are jointed the two pawl-links *g h*, hung upon the shaft *i* of the wheel *k*. This wheel has a peripheral flange, *l*, against the inner and opposite surfaces of which work two friction-pawls, *m n*. Each pawl is held in position by a toggle-arm, *o* or *p*, pivoted to the pawl-link by a pin, *q*. The arm *o* is so connected to its pawl that as the pawl-link *g* descends the friction of the pawl against the wheel-flange causes the arm *o* to rise, or the pawl link to move down relatively to the arm *o*, which movement presses the pawl outward, cramps it against the wheel-flange, and causes it to so bite upon the flange as to move the wheel by and with the pawl-link. In like manner the arm *p* is so arranged relatively to its link *h* and pawl *n* that as the link *h* rises the arm *p* forces the pawl *n* outward against the wheel-flange and the wheel and pawl move together. In moving in the opposite direction each pawl slips upon the flange, such movement relieving the pawl from the stress of its arm *o* or *p*. A spring, *r*, attached to each link *m n*, serves to hold the adjacent pawl up to the wheel-flange, so that the pawl will be in position to bind against the flange as the wheel moves in the direction of actuating movement of the pawl.

I claim—

The combination, with the reciprocating piston-rod, of the links, pawl-arms, friction-pawls, and flanged wheel, arranged and operating substantially as described.

HENRY F. WHEELER.

Witnesses:
FRANCIS GOULD,
M. W. FROTHINGHAM.